Patented Nov. 19, 1935

2,021,852

UNITED STATES PATENT OFFICE 2,021,852

METHOD OF MAKING ESTERS OF GLYCOLS

Gerald H. Coleman and Garnett V. Moore, Midland, Mich., assignors to The Dow Chemical Company, Midland, Mich., a corporation of Michigan No Drawing. Application May 5, 1932, Serial No. 609,494

14 Claims. (Cl. 260—106)

The present invention concerns an improved method of making an ester of a glycol, particularly ethylene glycol diacetate, through reacting an alkylene dichloride with an alkali metal salt of an aliphatic acid in the presence of a catalyst.

A number of previous workers have prepared ethylene glycol diacetate through reacting ethylene dichloride with an alkali metal acetate, but the reaction, as ordinarily carried out, yields a difficultly separable mixture containing not only ethylene glycol diacetate, but considerable quantities of by-products, e. g. ethylene glycol, ethylene glycol monoacetate, etc.

Meyer, in German Patent No. 332,677, has shown that when anhydrous ethylene dichloride is heated with anhydrous sodium acetate, under superatmospheric pressure at 230° C. for several hours, only a trace of reaction occurs. McElroy, U. S. Patent No. 1,259,758, reacted a chlorinated hydrocarbon mixture containing ethylene dichloride with calcium acetate in the presence of a considerable quantity of water (i. e. from about 2 to 2.5 parts, by weight, of water for each part of calcium acetate used) to form a product containing an ethylene glycol acetate. He states neither the yield nor the purity of the ethylene glycol acetate product, nor does he specify whether it is the mono- or di-acetate of ethylene glycol which is obtained. We have found that when ethylene dichloride is reacted with calcium acetate in the presence of water as a solvent, in a manner similar to that described by McElroy, the reaction proceeds slowly and ethylene glycol diacetate is obtained in relatively low yield and intermixed with undesirable by-products, such as ethylene glycol, ethylene glycol monoacetate, etc., from which it may be separated only with great difficulty. Water, apparently, hydrolyzes part of the glycol diacetate product under the conditions necessary for reaction.

We have now found that an alkylene dichloride, e. g. ethylene dichloride, propylene dichloride, alpha- or beta- butylene dichloride, iso-butylene dichloride, etc., may be reacted with an alkali metal salt of a lower fatty acid, e. g. an alkali metal acetate, propionate, butyrate, valerate, etc., in the presence of a catalyst selected from the group consisting of mono-, di-, and tri-alkyl-amines, mono-, di-, and tri-alkanol-amines, cyclic amines such as cyclohexylamine, ring nitrogen bases such as pyridine, piperidine, quinoline, etc., and salts of any of the amines and bases mentioned, to form a glycol di-ester in excellent yield and substantially free from difficultly separable by-products such as free glycols or glycol mono- esters. We have found, furthermore, that while a solvent, such as alcohol, acetic acid, benzene, toluene, etc., may be employed in carrying out the reaction, the employment of such solvent is unnecessary and that it frequently interferes with the smoothness of the reaction and purity of the product formed.

To the accomplishment of the foregoing and related ends, the invention, then, consists of the method hereinafter fully described and particularly pointed out in the claims, the following description setting forth in detail several modes of carrying out the invention, such disclosed modes illustrating, however, but several of the various ways in which the principle of the invention may be used.

In preparing ethylene glycol diacetate, for example, according to our improved method, an alkali metal acetate is mixed with preferably more than its chemical equivalent of ethylene dichloride; one of the previously mentioned catalysts is added in amount representing preferably less than one-tenth of a molecular equivalent of catalyst for each mole of acetate used, and the mixture is agitated and heated under super-atmospheric pressure at a temperature between about 150° and about 250° C. The reaction, when carried out at 200° C., is usually substantially completed after heating in such manner for from about 1 to 2 hours, but longer heating is sometimes required, particularly when the reaction is carried out at lower temperatures. The reacted mixture is then cooled and filtered to remove alkali metal chloride therefrom, and the filtrate is fractionally distilled to separate glycol diacetate as the substantially pure compound. The catalyst separated from the mixture may be re-employed in the process.

Other alkylene di-esters of aliphatic acids, e. g. butylene glycol dibutyrate, etc., may be prepared through reacting the corresponding alkylene dichloride with an alkali metal salt of the required aliphatic acid in the presence of one of the previously mentioned catalysts, in a manner similar to that described above.

Through operating according to the above described general method, a glycol di-ester may be formed in excellent yield without simultaneous formation of appreciable quantities of a glycol or a glycol monoester and the difficulties usually encountered in purifying the diester product through fractional distillation thereof are largely avoided.

The nitrogen-containing catalysts herein described may be employed in amount exceeding 0.1 mol. of catalyst per mol. of acid salt, if desired, but ordinarily the employment of such large quantity of catalyst is unnecessary.

The following table of examples sets forth the yields of ethylene glycol diacetate obtained through reacting ethylene dichloride with sodium acetate in the presence of various compounds which we have found to catalyze the reaction. As a basis for judging the activity of the catalysts herein disclosed, the first two runs described in the table were made in the absence of a catalyst. Run 2 illustrates the fact that ethylene dichloride may be heated with sodium acetate, in the absence of either a catalyst or solvent, at 200° C. for as long as 10.5 hours without appreciable reaction occurring.

It is to be understood that the examples set forth in the table are purely illustrative of certain ways in which the principle of our invention may be applied, and are not to be construed as limitations on the invention.

serves as a substantially non-reactive dispersant for the alkali metal salt and permits maintenance of an even reaction temperature throughout the mixture. The reaction may, however, be carried out successfully, though less conveniently, by using equimolecular quantities of the two reactants or even by heating the aforementioned alkali metal salt with less than its chemical equivalent of an alkylene dichloride. Again, although the reaction proceeds most smoothly at a temperature between about 175° and about 225° C., it may be carried out successfully at any temperature between about 150° and about 250° C.

The present invention, in brief, comprises reacting an alkylene dichloride with an alkali metal salt of a lower aliphatic acid containing at least two carbon atoms, in the presence of a catalyst selected from the group consisting of alkylamines, alkanol-amines, alicyclic amines, pyradine bases, and salts of said amines and bases, to form the corresponding glycol di-ester.

TABLE OF EXAMPLES

| Run No. | Reactants | | Catalyst | | Reaction conditions | | Percent yield of ethylene glycol diacetate, based on quantity of sodium acetate used |
|---|---|---|---|---|---|---|---|
| | Gram-mols of ethylene dicloride | Gram-mols of sodium acetate | Kind | Gram-mols | Reaction temperature °C. | Reaction period hours | |
| 1 | 1.2 | 1.0 | None | | 175 | 6 | Trace. |
| 2 | 1.1 | 1.0 | None | | 200 | 10.5 | Trace. |
| 3 | 1.0 | 1.0 | Ethylamine hydrochloride | 0.01 | 175 | 6 | 50 |
| 4 | 1.0 | 1.0 | Diethylamine | 0.01 | 175 | 6 | 74 |
| 5 | 1.0 | 1.0 | Triethylamine | 0.01 | 175 | 6 | 72 |
| 6 | 1.0 | 1.0 | Monoethanolamine | 0.01 | 175 | 6 | 65 |
| 7 | 1.0 | 1.0 | Triethanolamine | 0.01 | 175 | 6 | 85 |
| 8 | 1.0 | 1.0 | Cyclohexylamine hydrochloride. | 0.01 | 175 | 6 | 73 |
| 9 | 1.0 | 1.0 | Pyridine | 0.01 | 175 | 6 | 75 |
| 10 | 1.0 | 1.0 | Quinoline | 0.01 | 175 | 6 | 85 |

The principle of our invention may be employed in ways other than those set forth in the examples. We have, for instance, reacted propylene dichloride with sodium acetate to obtain propylene glycol diacetate; 1,2-butylene dichloride with sodium acetate to obtain 1,2-butylene glycol diacetate; ethylene dichloride with sodium propionate to obtain ethylene glycol dipropionate; and ethylene dichloride with sodium butyrate to form ethylene glycol dibutyrate. All of said reactions were carried out in the presence of catalysts selected from those previously mentioned.

In place of a sodium salt of an aliphatic acid, the corresponding potassium salt (e. g. potassium acetate, potassium propionate, etc.) or, in fact, any corresponding alkali metal salt of such acid may be reacted with an alkylene dichloride in the presence of a member of our new class of catalysts to form the corresponding glycol di-ester.

In place of the catalysts specifically disclosed in the foregoing description, other catalysts such as monobutylamine, tributylamine, cyclohexylamine, 2-methyl-cyclohexylamine, ethylene diamine, triethylamine hydrochloride, tripropylamine, sulphate, diethylamine hydrobromide, tributylamine ecetate, etc., may be employed successfully to promote the reaction of an alkylene dichloride with an alkali metal salt of a lower aliphatic acid to form the corresponding glycol di-ester.

In practicing our invention we prefer, as illustrated by the specific examples, to heat an alkali metal salt of an aliphatic acid with more than its chemical equivalent of an alkylene dichloride, in the presence of one of the catalysts herein disclosed, to a temperature between about 175° and about 225° C. The excess of alkylene dichloride Other modes of applying the principle of our invention may be employed instead of those explained, change being made as regards the method herein disclosed, provided the means stated by any of the following claims or the equivalent of such stated means be employed.

We therefore particularly point out and distinctly claim as our invention:—

1. The method of making a glycol di-ester which comprises reacting an alkylene dichloride with an alkali metal salt of a lower fatty acid in the presence of a catalyst selected from the group consisting of alkyl amines, alkanol-amines, alicyclic amines, pyridine bases, and salts of such amines and bases.

2. The method of making a glycol di-ester which comprises reacting an alkylene dichloride with an alkali metal salt of a lower fatty acid containing at least two carbon atoms, in the presence of a catalyst selected from the group consisting of alkyl amines, alkanol amines, alicyclic amines, pyridine bases, and salts of such amines and bases, the catalyst being employed in amount representing less than 0.1 mole of catalyst for each mole of the alkali metal salt used and the reaction being carried out under superatmospheric pressure and at a temperature between about 150° and about 250° C.

3. The method of making an ethylene glycol di-ester which comprises reacting ethylene dichloride with an alkali metal salt of a lower fatty acid containing at least two carbon atoms, in the presence of catalyst selected from the group consisting of alkyl amines, alkanol amines, alicyclic amines, pyridine bases, and salts of said amines and bases, the reaction being carried out under superatmospheric pressure and at a temperature between about 150° and about 250° C.

4. In a method of making an ethylene glycol di-ester, the step which consists in heating an alkali metal salt of a lower fatty acid with ethylene dichloride, in the presence of a catalyst selected from the group consisting of alkyl amines, alkanol amines, alicyclic amines, pyridine bases, and salts of said amines and bases under superatmospheric pressure to a temperature between about 175° and 225° C.

5. The method of making ethylene glycol diacetate which comprises reacting ethylene dichloride with an alkali metal acetate in the presence of a catalyst selected from the group consisting of alkyl amines, alkanol amines, alicyclic amines, pyridine bases, and salts of said amines and bases, the catalyst being employed in amount representing less than 0.1 mol of catalyst for each mol ol alkali metal acetate used and the reaction being carried out under superatmospheric pressure and at a temperature between about 150° and about 250° C.

6. The method of making ethylene glycol diacetate which comprises reacting ethylene dichloride with sodium acetate in the presence of a catalyst selected from the group consisting of alkyl amines, alkanol amines, alicyclic amines, pyridine bases, and salts of said amines and bases.

7. The method of making ethylene glycol diacetate which comprises heating sodium acetate with more than its chemical equivalent of ethylene dichloride, in the presence of a catalyst selected from the group consisting of alkyl amines, alkanol amines, alicyclic amines, pyridine bases, and salts of said amines and bases, under superatmospheric pressure to a temperature between about 150° and about 250° C.

8. In a method of making ethylene glycol diacetate, the steps which consist in heating sodium acetate with more than its chemical equivalent of ethylene dichloride, in the presence of a catalyst selected from the group consisting of alkyl amines, alkanol amines, alicyclic amines, pyridine bases, and salts of said amines and bases, under superatmospheric pressure to a temperature between about 175° and 225° C., and fractionally distilling the reaction mixture to separate ethylene glycol diacetate therefrom.

9. The method of making a glycol di-ester which comprises reacting an alkylene dichloride with an alkali metal salt of a lower fatty acid in the presence of a lower alkyl amine.

10. The method of making ethylene glycol diacetate which comprises reacting ethylene dichloride with sodium acetate in the presence of an ethylamine, the reaction being carried out under superatmospheric pressure at a temperature between about 150° and about 250° C.

11. The method of making a glycol di-ester which comprises reacting an alkylene dichloride with an alkali metal salt of a lower fatty acid in the presence of an alicyclic amine.

12. The method of making ethylene glycol diacetate which comprises reacting ethylene dichloride with sodium acetate in the presence of a cyclohexylamine, the reaction being carried out under superatmospheric pressure at a temperature between about 150° and about 250° C.

13. The method of making a glycol di-ester which comprises reacting an alkylene dichloride with an alkali metal salt of a lower fatty acid in the presence of a pyridine base.

14. The method of making ethylene glycol diacetate which comprises reacting ethylene dichloride with sodium acetate in the presence of pyridine, the reaction being carried out under superatmospheric pressure at temperatures between about 150° and about 250° C.

GERALD H. COLEMAN.
GARNETT V. MOORE.